United States Patent [19]

Gibson

[11] 4,232,570
[45] Nov. 11, 1980

[54] VARIABLE RATIO TRANSMISSION SYSTEMS

[75] Inventor: Peter J. Gibson, Guildford, England

[73] Assignee: The Secretary of State for Defence in Her Britannic Majesty's Government of the United Kingdom of Great Britain and Northern Ireland, London, England

[21] Appl. No.: 863,103

[22] Filed: Dec. 22, 1977

[30] Foreign Application Priority Data

Dec. 22, 1976 [GB] United Kingdom ............ 53641/76

[51] Int. Cl.² ........................................... B60K 41/16
[52] U.S. Cl. ........................................ 74/866; 74/687; 74/861; 74/865
[58] Field of Search ............... 74/865, 866, 863, 861

[56] References Cited

U.S. PATENT DOCUMENTS

| 3,238,816 | 3/1966 | Schottler | 74/690 |
| 3,242,753 | 3/1966 | Standing et al. | 74/865 |
| 3,324,740 | 6/1967 | Lewis et al. | 74/866 |
| 3,534,631 | 10/1970 | Keller | 74/687 |
| 3,834,499 | 9/1974 | Candellero et al. | 74/339 X |
| 3,885,472 | 5/1975 | Wakamatsu et al. | 74/866 |

FOREIGN PATENT DOCUMENTS

| 967268 | 5/1975 | Canada | 74/866 |
| 7505529 | 12/1975 | Netherlands | 74/866 |
| 1439675 | 6/1976 | United Kingdom | 74/866 |

Primary Examiner—Leslie Braun
Attorney, Agent, or Firm—Pollock, Vande Sande and Priddy

[57] ABSTRACT

A transmission system is disclosed in which a stepped-ratio system having a conventional gearbox is combined with a short range, smoothly adjustable-ratio system to give a continuous range of transmission ratios through and beyond tne fixed ratio steps of the gearbox.

An arrangement is described in which all the variable parameters of the system are commanded by an electrically operated control system in response to a single demand signal from an operator.

3 Claims, 7 Drawing Figures

VARIABLE RATIO TRANSMISSION SYSTEMS

This invention relates to a variable ratio transmission system capable of controlled, smooth variation throughout the normal range of a conventional stepped-ratio gearbox. In particular but not exclusively it is suitable for use in a motor vehicle.

The advantages of variable ratio transmission systems are well known and include high power utilization, the elimination of undesirable sudden speed changes at the engine, and rapid acceleration. A large number of such systems have been previously described, many of which are formed from two inter-related transmission subsystems, one providing stepped-ratio transmission and the other providing variable-ratio transmission which may be smoothly varied throughout a limited range arranged to span the gaps of the stepped-ratio subsystem. In the majority of these systems the complex interlinking required between the two subsystems necessitates an integral and expensive form of construction and prohibits the use of standard components.

It is an object of the present invention to provide a variable ratio transmission system wherein a smoothly adjustable-ratio transmission subsystem may be interlinked with a conventional stepped-ratio mechanism such as a motor vehicle gearbox in order to achieve a continuous range of transmission ratios between and beyond the standard ratios of the gearbox. A further object is to provide synchronization for each of the standard gear shifts.

According to the present invention a variable ratio transmission system includes an epicyclic gear train arranged to have two input elements and one output element, a smoothly adjustable-ratio transmission subsystem arranged to drive one of the input elements of the epicyclic gear train, a prime mover arranged to drive the other input element of the epicyclic gear train and also to drive the smoothly adjustable-ratio transmission subsystem and a stepped-ratio gearbox arranged to be driven by the output element of the epicyclic gear train. The stepped-ratio gearbox may be of conventional design.

The epicyclic gear train may comprise one sun gear, two or more planet gears, one planet carrier and one annulus, preferably arranged so that the sun gear and the planet carrier each comprise one of the two input elements and the annulus comprises the output element.

The smoothly adjustable-ratio transmission subsystem may be hydrostatic and may comprise a variable capacity hydraulic pump driven by the prime mover either directly or indirectly via the output element of the epicyclic gear train, the pump being hydraulically coupled to drive a fixed capacity hydraulic motor having an output shaft arranged to drive one of the input elements of the epicyclic gear train. The hydraulic pump is preferably selected to have a variable capacity range which will provide a continuous range of transmission ratios sufficient to span the largest gap between the fixed gear ratios of the particular conventional gearbox used. The overall transmission ratio can then be smoothly varied throughout the entire range of the system, with a further advantage that synchronous fixed-gear shifts can be effected at appropriate settings of the variable range with no change in overall speed ratio and only slight interruption in power transmission.

Separate adjustment of the smoothly adjustable-ratio transmission subsystem may be manually effected by a skilled operator. However, greater efficiency will be obtained if the adjustment is effected by means of an overall control system which also selects the other conventional variables of the transmission system ie speed of the prime mover, gear ratio of the conventional gearbox and operation of a clutch mechanism which may be fitted between the prime mover and the appropriate input element of the epicyclic gear train. Proper selection of all these variables may then be effected by the control system in response to a single demand from the operator.

Embodiments of the invention will now be described by way of example only with reference to the drawings accompanying this specification, of which

Figure 1:
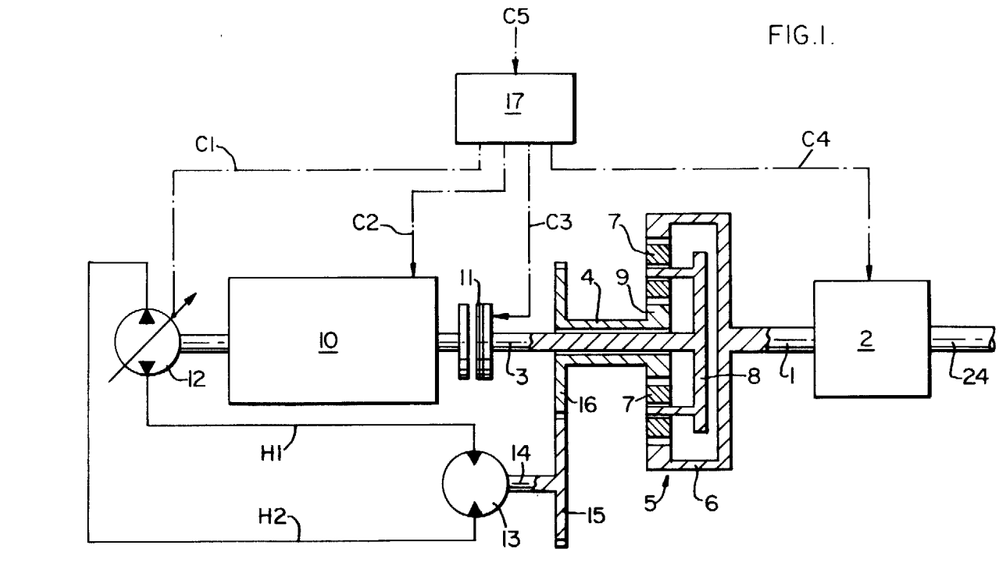
FIG. 1 is a symbolic representation of a variable ratio transmission system embodying the basic principles of the invention.

In the transmission system illustrated in FIG. 1 an input shaft 1 of a conventional gearbox 2 is driven at the resultant speed of two drive shafts 3 and 4 via an epicyclic gear train 5. The epicyclic gear train 5 consists of an annulus 6 comprising a single output element of the gear train 5, two planet gears 7 rotatably pinned to a planet carrier 8 which carrier comprises a first input element of the gear train 5, and a sun gear 9 arranged as a second input element of the gear train 5. The annulus 6 is mounted on the input shaft 1 of the gearbox 2, and the planet carrier 8 and the sun gear 9 are respectively mounted on the drive shafts 3 and 4, the shaft 3 being concentrically journalled within the hollow shaft 4.

Both the drive shafts 3 and 4 are driven by a common prime mover which in this example is a conventional vehicle engine 10, the shaft 3 being directly driven via a clutch 11 and the shaft 4 being indirectly driven via a hydrostatic transmission unit consisting of a variable capacity hydraulic pump 12 having two directions of flow, and a fixed capacity hydraulic motor 13 which is hydraulically coupled with the pump 12 via lines H1 and H2. The motor 13 has an output shaft 14 which engages with the drive shaft 4 by means of spur gears 15 and 16.

Control of the transmission system is achieved via four control linkages C1 to C4, each of which may be operated manually or alternatively by means of a control system 17 commanded by the vehicle driver via a single control linkage C5. The control linkages C1 to C4 are respectively connected to control the capacity of the pump 12, the output torque of the engine 10, the engagement of the clutch 11 and the selection of gear ratios in the gearbox 2.

Figure 2:
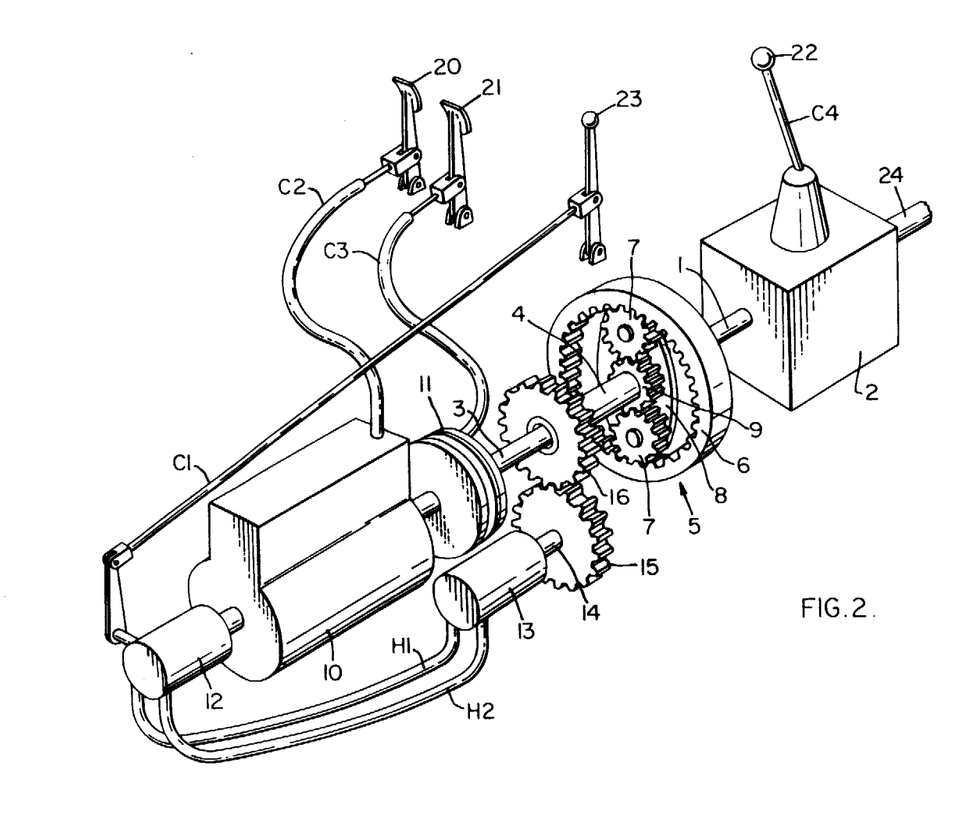
FIG. 2 is a sketch of a manually controlled arrangement of the transmission system represented in FIG. 1.

A simple, manually operated arrangement of the transmission system is illustrated in FIG. 2, all four control linkages C1 to C4 being individually commanded by the vehicle driver using conventional transmission control levers, ie an accelerator pedal 20, a clutch pedal 21 and a gear lever 22, together with an additional control lever 23 for varying the displacement capacity of the pump 12. Operation of this arrangement is as follows.

When the clutch 11 is engaged, the engine 10 drives the shaft 3 and the planet carrier 8 at engine speed. If the variable capacity hydraulic pump 12 is set to zero displacement, the output shaft 14 of the hydraulic motor 13 is unable to rotate and rotation of the gears 15 and 16, the drive shaft 4 and the sun gear 9 is inhibited. The annulus 6 therefore rotates at a speed dependent only upon the speed at which the planet gears 7 orbit the fixed sun gear 9. If control is then applied to increase the displacement of the hydraulic pump 12 in either a forward or a reverse direction of fluid flow, the output shaft 14 of the hydraulic motor 13 will rotate in either a clockwise or anti-clockwise direction. Rotation of the output shaft 14 in the same direction as the drive shaft 3 acts via the gears 15 and 16 to rotate the drive shaft 4 in the opposite direction, causing the sun gear 9 to rotate in opposition to the planet carrier 8, thereby increasing the output speed of the annulus 6. Conversely, rotation of the output shaft 14 in the opposite direction to that of the drive shaft 3 acts to decrease the output speed of the annulus 6.

Hydrostatically produced variations are thus superimposed upon the output speed produced by the direct mechanical transmission path at the annulus 6, the resultant rotational speed being transmitted to the vehicle drive wheels (not shown) through the gearbox 2 via the input shaft 1, an engaged gear train in the gearbox and an output shaft 24.

The total range of hydrostatic speed variation available as a result of complete fluid flow reversal within the hydraulic circuit of the pump 12 and the motor 13, ie from full forward flow to full reverse flow, is selected just to span the widest gear ratio gap existing in the gearbox 2. Hence the speed of the output shaft 24 can be smoothly increased at constant engine speed throughout the entire hydrostatic variation range via the control linkage C1 for each gear ratio of the gearbox 2. When the maximum of the hydrostatic variation range is reached in a particular gear ratio the clutch 11 and the gearbox 2 are disengaged via the control linkages C3 and C4 respectively. The speed of rotation of the input shaft 1 is then reduced via the control linkage C1 towards the minimum of the hydrostatic variation range, where upon a point will be reached at which the next higher gears in the gearbox 2 can be synchronously engaged. This sequence of operation is repeated for each gear ratio.

Figure 3:
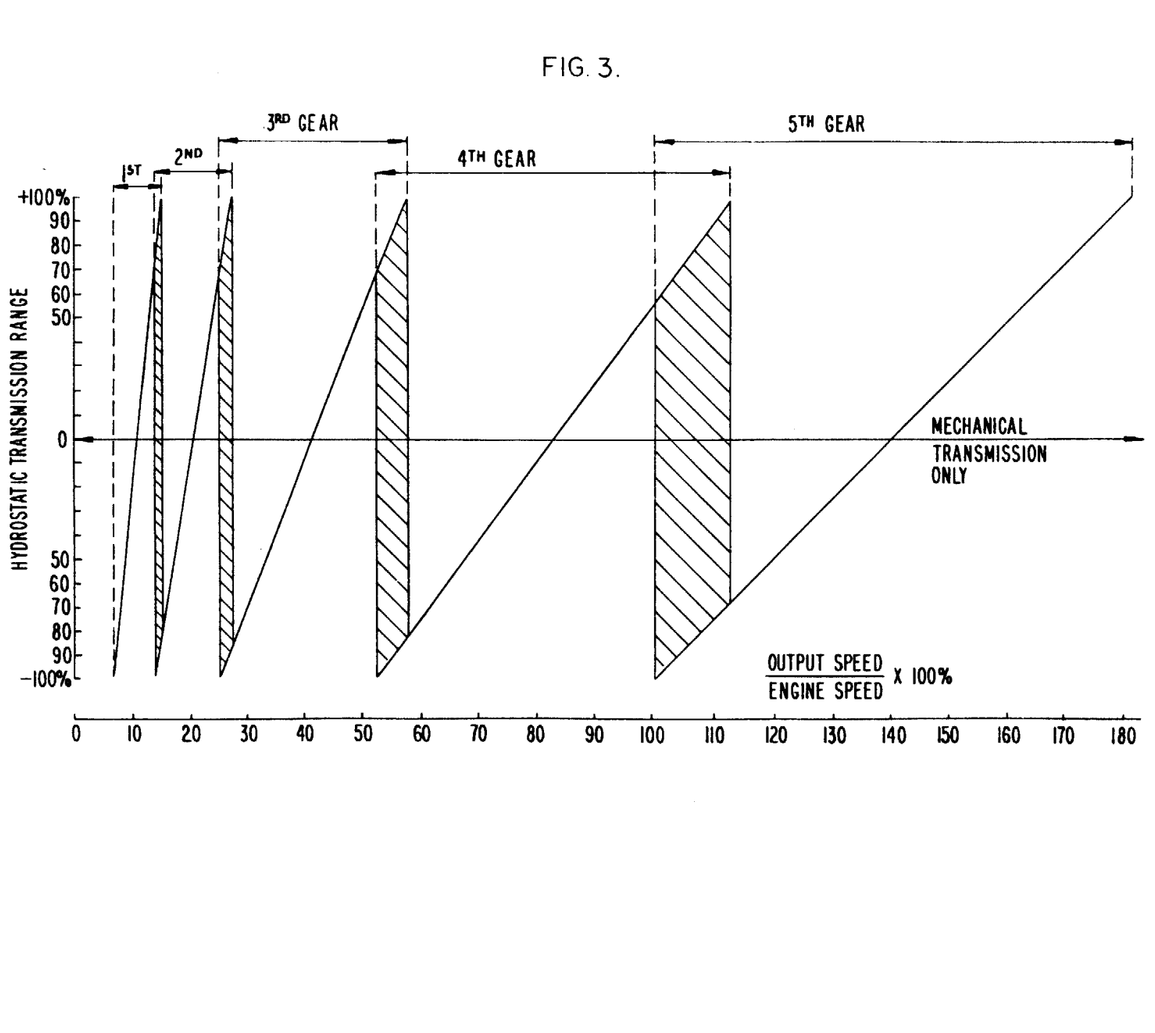
FIG. 3 is a graphical representation of the operation of the transmission system illustrated in FIGS. 1 and 2 in respect of a particular gearbox.

The sequential operation of the transmission system for one particular gearbox and epicyclic gear train may be seen in FIG. 3. This graph illustrates the effect upon rotational speed of the output shaft 24 of varying the hydrostatic component of transmission throughout its full range of plus or minus 100% for each fixed gear ratio in turn, at constant engine speed. The speed of the output shaft is expressed as a percentage of engine speed. This particular gearbox has five fixed ratios of 1:1, 1.6:1, 2.7:1, 4.5:1 and 8:1, from fifth gear to first gear respectively. A maximum ratio gap of 1.778 occurs between first and second gear and hence variation of the ratio throughout the range of 1:1.778 is required from the hydrostatic transmission component, ie a variation of plus or minus 28% on a mid range value of 1.389. This is achieved by the use of an epicyclic gear train having an annulus of 95 teeth, a sun gear of 37 teeth and planet gears each of 29 teeth, the maximum speed of the sun gear being the same as that of the engine.

With this arrangement synchronous gear shifts can be effected within the following regions of the hydrostatic variation range:

First gear at plus 100% into second gear at minus 100%;

Second gear at any setting between plus 71.4% and plus 100% into third gear between minus 100% and minus 86% respectively;

Third gear at any setting between plus 68% and plus 100% into fourth gear between minus 100% and minus 83% respectively; Fourth gear at any setting between plus 53% and plus 100% into fifth gear between minus 100% and minus 70% respectively.

These regions of synchronous gear shift are shown shaded in FIG. 3. For highest overall efficiency the upward gear shifts are controlled to take place as late as possible, as recirculation of power occurs when the hydrostatic transmission is negative.

It will be seen that when the transmission system is in fifth gear with plus 100% hydrostatic transmission, a considerable overdrive ratio of 0.52:1 is obtained and a step down gear may therefore be provided in the system if desired.

To illustrate the power requirements of the hydrostatic subsystem of a transmission system according to the invention, its application to a specific 30 ton truck will now be discussed. The selected truck is fitted with a diesel engine having a maximum BHP of 204 DIN at 2,100 rpm and a maximum torque of 586 lb-ft at 1,350 rpm. Its nine-speed gearbox has a largest gear ratio gap of 1.36. Consequently the units providing hydrostatic transmission, i.e. the pump 12 and the motor 13 need to be capable of providing a range of ratio variation from 1:1.36 with a mid range value of 1.18, i.e. plus or minus 15%. The provision of such range also extends the overall speed range of the system, the maximum output speed in top gear being extended by a factor of 1.36.

The torque on the output shaft 14 of the motor 13 is proportional to the torque on the gearbox input shaft 1, which shaft 1 transmits constant power at all gear ratios and therefore the worst torque condition occurs at the lowest speed of the shaft 1 and is, in this example, 15% of the engine torque at 2,100 rpm. Hence the pump 12 and the motor 13 need to be sized for the transmission of a maximum of approximately 35 BHP.

It will be apparent to those skilled in the art that other arrangements of the invention are possible and many further refinements may be added to the basic transmission system to enhance its performance. Some examples of such refinements are included in a modified arrangement of the basic transmission system and illustrated in FIG. 4. In this arrangement the basic elements are identical with those of the previous arrangement, with the addition of a control system 17 commanded by the operator via the accelerator pedal 20 and a control linkage C5. A control linkage C6 between the control system 17 and the engine 10 is also provided to sense engine speed and to regulate throttle opening in order to maintain constant engine operating conditions. Further optional refinements are illustrated as follows.

Figure 4:
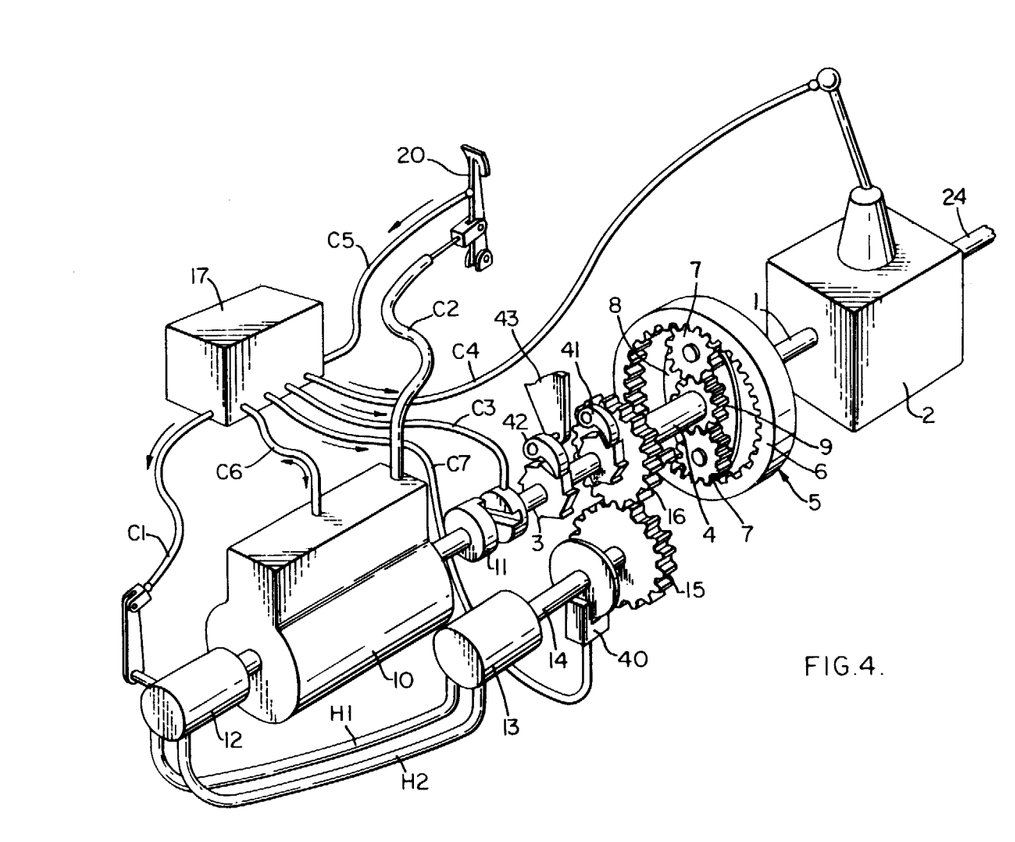
FIG. 4 is a sketch of an automatically controlled arrangement of the transmission system represented in FIG. 1.

A control linkage C7 from the control system 17 actuates a brake 40 operative upon the output shaft 14 of the motor 13. The provision of this brake ensures that the shaft 14 and consequently the shaft 4 and the sun gear 9 are held completely stationary when the pump 13 is set to zero displacement, i.e. at mid range, thus preventing any slight rotation which may occur as a result of leakage in the hydraulic circuit of the pump 12 and the motor 13. Some friction losses would also be removed by this device. Alternatively the brake 40 may be directly operative upon the input shaft 4.

An additional improvement in drive efficiency can be achieved by the provision of a ratchet clutch 41, or other one way clutch device, engageable between the two drive shafts 3 and 4 when they are rotating at the same speed and in the same direction, i.e. when the pump 12 is operating at the minimum end of the hydrostatic speed variation range. The clutch 41 then prevents the shaft 4 from rotating any faster than the shaft 3 and effectively provides direct mechanical linkage between the engine and the vehicle thus removing all load from the motor 13.

The ratchet clutch 41 also permits transmission by the hydrostatic subsystem alone via the drive shaft 4, when the clutch 11 is disengaged. This transmission mode may be advantageous when moving the vehicle away from rest. If such a starting mode is employed the clutch 11 can comprise a relatively inexpensive dog clutch instead of a friction clutch as used in the arrangement of FIG. 2.

A second ratchet clutch 42 engageable between the engine frame 43 and the drive shaft 3 is also advantageous when the hydrostatic transmission mode is employed solely. This clutch 42 prevents reverse rotation of the drive shaft 3 with the drive shaft 4 when the clutch 11 is disengaged, thereby permitting a much greater reduction in speed during this transmission mode.

Of course, if advantage is to be taken of this transmission mode the pump 12 and the motor 13 must be capable of transmitting considerably more power than specified in the previously described example. The required power is ideally equal to engine power multiplied by the largest gear ratio gap encountered in the gearbox.

Another advantage gained by the combined use of the brake 40 and the ratchet clutch 41 under the control of the control system 17 is that it is possible to achieve increased fuel economy. The control system 17 may be arranged so that the engine is operated near to its most favourable conditions at all times, small variations of engine speed being permitted only, in order to prolong the periods of high efficiency which exist when the drive is transmitted by direct mechanical linkages. These periods occur when the pump 13 is stationary and the brake 40 is applied to prevent the input shaft 4 from rotating, and also when the pump 13 is operating at the minimum end of the hydrostatic speed variation range and the clutch 41 is engaged to lock the input shafts 3 and 4 together.

The control system 17 of the arrangement illustrated in FIG. 4 is electrically operated and comprises a logic circuit suitably interconnected with an actuator and a condition indicating means in respect of each variable parameter of the transmission system, so as to achieve optimum performance of the transmission system at all times.

Figure 5:
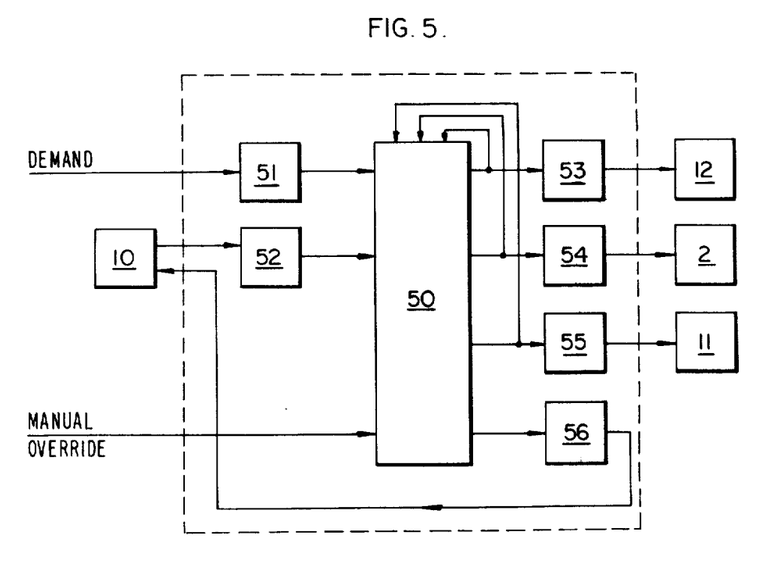
FIG. 5 represents a control system for the arrangement illustrated in FIG. 4.

A basic arrangement of such control system is illustrated in FIG. 5, in which an engine speed demand signal from the vehicle operator is fed to a logic circuit or controller 50 via a signal modifier 51. The mathematical function of the signal modifier is pre-selected to schedule the speed/torque relationship of the engine so as to minimize fuel consumption. The signal modifier 51 also introduces a delay which ensures that the rate of change of engine speed demanded at the controller 50 cannot exceed the maximum rate achievable by the engine under no-load conditions.

The demanded speed is compared by the controller 50 with the actual speed of the engine 10 as measured by an engine speed indicator 52, which may comprise a tachogenerator or a magnetic pickup device. The controller 50 then applies the necessary logic to promote, in the correct sequence and at the proper time, adjustments of each transmission variable, i.e. the capacity of the pump 12 via an actuator 53, the gear ratio of the gearbox 2 via an actuator 54, the engagement and disengagement of the clutch 11 via an actuator 55 and the throttle setting of the engine 10 via an actuator 56, the existing condition data in respect of the first three being supplied to the controller 50 by means of feedback loops from the respective actuators.

In this example the actuators 53, 54, 55 and 56 are electrically operated hydraulic rams. Further actuators can also be commanded by the controller 50 to adjust other optional variables in the transmission system, for example, the brake 40 previously discussed with reference to FIG. 4. Manual override for each transmission variable can also be provided if required by means of additional inputs to the controller 50.

Figure 6:
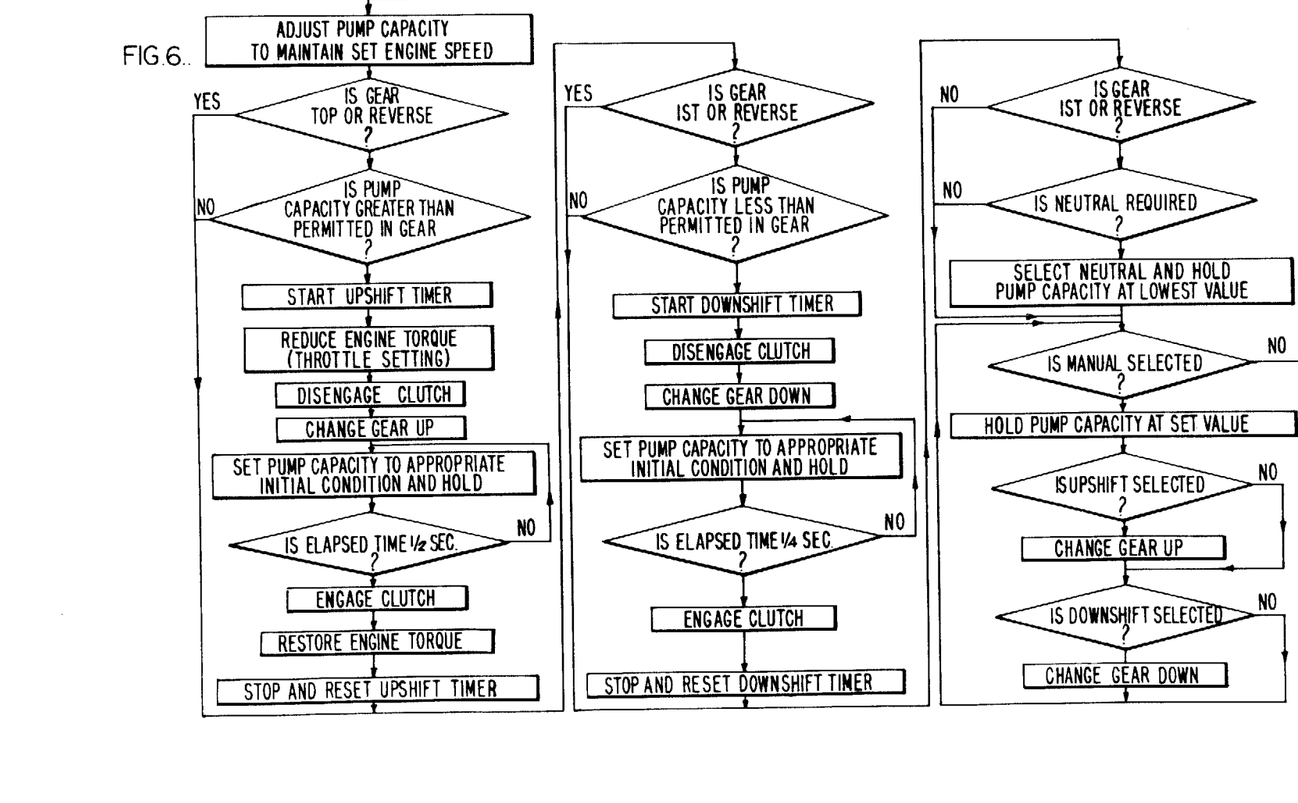
FIG. 6 is an example flow chart appropriate to the control system illustrated in FIG. 5
Figure 7:
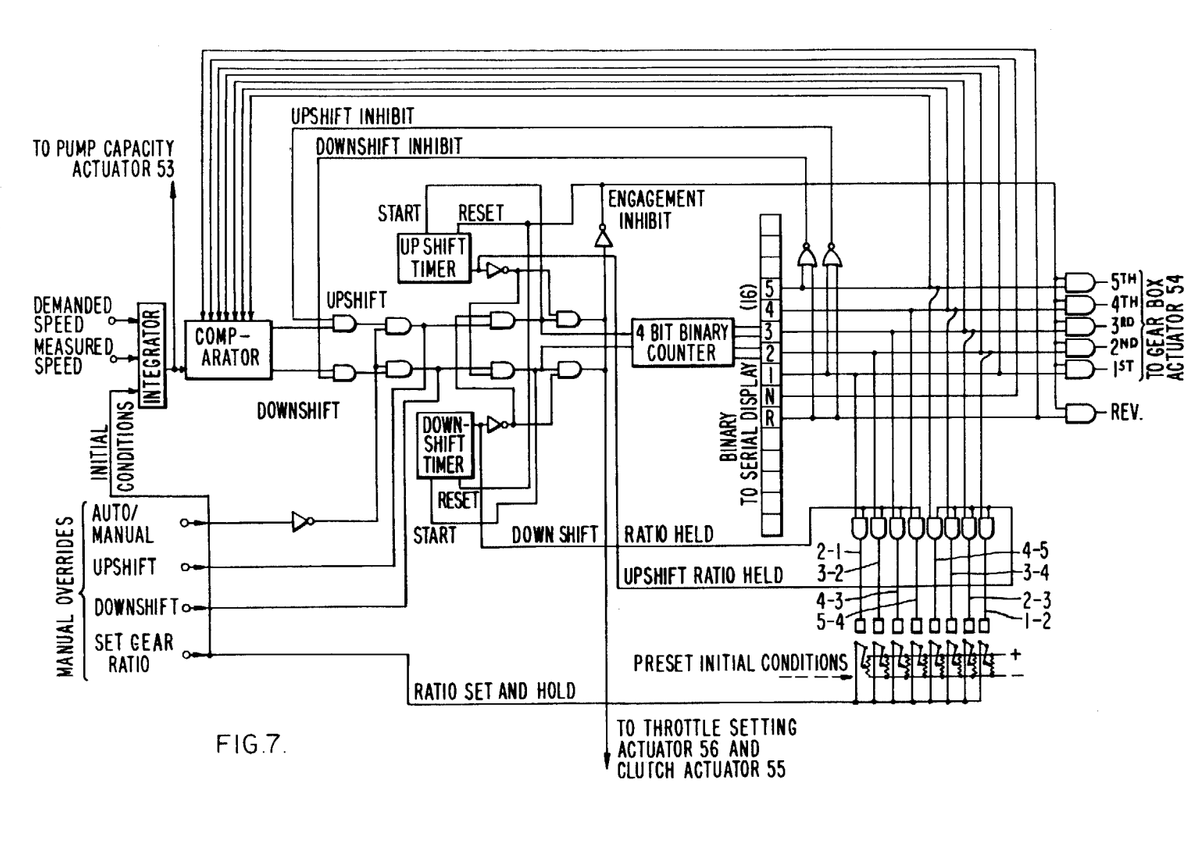
FIG. 7 is an example circuit capable of supplying the logic demanded in FIG. 6.

One example of the logic that may be applied by the controller 50 to achieve efficient transmission is set out in FIG. 6. Such logic can be provided by dedicated circuits of the form illustrated in FIG. 7 for example, or alternatively by an accordingly programmed microprocessor.

It will be apparent that many other arrangements of the control system are possible, as too are other arrangements of the mechanical components of the transmission system, all of which embody the basic principles of the present invention and offer the particular advantage of high efficiency at comparatively low cost. The cost is low because standard gearboxes can be used and also because the hydrostatic transmission components required are small, typically transmitting only about 20% of engine power. Efficiency is high for the same latter reason, hydraulic losses being a function of the small proportion of overall power transmission that is contributed by the hydrostatic subsystem.

I claim:

1. A variable ratio transmission system for coupling a drive shaft of a prime mover to a load, including
   a clutch;
   an epicyclic gear train having first and second input elements and an output element, said first input element being coupled to said drive shaft via said clutch;
   a stepped-ratio gear box having an input shaft coupled to said output element of the epicyclic gear train, and an output shaft coupled to said load;
   a smoothly adjustable-ratio hydrostatic transmission subsystem having a ratio range substantially equal to the greatest ratio step of said gear box and comprising
   a variable capacity pump mechanically coupled with said drive shaft, and
   a fixed capacity motor hydraulically coupled with said pump and mechanically coupled to said second input element of the epicyclic gear train; and
   an electrical control system including:
   an operator-controlled load demand means, a plurality of actuators for varying each of the following variable parameters of said transmission system: the speed of said drive shaft, the engaged/disengaged condition of said clutch, the ratio of said gear box, and the ratio of said hydrostatic sub-system, a plurality of sensing means operative to produce signals representative of each of the said variable parameters, and logic means responsive to input signals received from said sensing means and from said load demand means, and generating actuator command signals in an actuator drive circuit respective to each of said actuators.

2. A system as claimed in claim 1 wherein said actuators each comprise electrically operated hydraulic rams operative upon conventional mechanical adjusting means.

3. A system as claimed in claim 1, wherein said sensing means respective to said drive shaft speed comprises a tachogenerator, and said sensing means respective to said clutch condition, said gear box ratio and said hydrostatic sub-system ratio, each comprise a feedback loop from the respective actuator drive circuit.

* * * * *